(12) United States Patent
Lee

(10) Patent No.: US 11,880,673 B2
(45) Date of Patent: Jan. 23, 2024

(54) APPARATUS FOR UPDATING A VEHICLE AND A METHOD THEREOF

(71) Applicants: HYUNDAI MOTOR COMPANY, Seoul (KR); KIA CORPORATION, Seoul (KR)

(72) Inventor: Chung Hi Lee, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 232 days.

(21) Appl. No.: 17/478,436

(22) Filed: Sep. 17, 2021

(65) Prior Publication Data
US 2022/0179638 A1 Jun. 9, 2022

(30) Foreign Application Priority Data
Dec. 8, 2020 (KR) .......... 10-2020-0170858

(51) Int. Cl.
*G06F 8/65* (2018.01)
*B60L 53/126* (2019.01)
*B60L 58/12* (2019.01)

(52) U.S. Cl.
CPC .............. *G06F 8/65* (2013.01); *B60L 53/126* (2019.02); *B60L 58/12* (2019.02); *B60Y 2200/91* (2013.01); *B60Y 2400/112* (2013.01)

(58) Field of Classification Search
CPC .......... B60Y 2400/112; B60Y 2200/91; B60L 58/12; B60L 53/126; G06F 8/65
See application file for complete search history.

(56) References Cited

U.S. PATENT DOCUMENTS

| | | | | |
|---|---|---|---|---|
| 2010/0174667 | A1* | 7/2010 | Vitale | B60L 53/305 |
| | | | | 705/412 |
| 2014/0143002 | A1* | 5/2014 | Aisu | G06Q 10/1093 |
| | | | | 705/7.18 |
| 2018/0203683 | A1* | 7/2018 | Kim | G06F 8/65 |
| 2019/0210545 | A1* | 7/2019 | Sangameswaran | B60R 16/033 |
| 2019/0265965 | A1* | 8/2019 | Acharya | H04L 9/3263 |
| 2019/0308520 | A1* | 10/2019 | Ward | G01C 21/34 |
| 2022/0410754 | A1* | 12/2022 | Sakurai | B60L 53/66 |

FOREIGN PATENT DOCUMENTS

JP 2018107645 A * 7/2018

OTHER PUBLICATIONS

Lewandowski et al., "metropol-E: A System for Analyzing and Optimizing Urban Electric Vehicle Fleets" (Year: 2012).*
Gopal et al., "Building the Business Case for Telematics Based Diagnostics at Mahindra Reva" (Year: 2012).*

* cited by examiner

*Primary Examiner* — Phillip H Nguyen
(74) *Attorney, Agent, or Firm* — Lempia Summerfield Katz LLC (57) ABSTRACT

An apparatus for updating a vehicle and a method thereof may calculate an update time for each update target of an over-the-air (OTA) update for the vehicle in which a battery is charged based on a charging schedule. The apparatus and the method may also perform the OTA update of the vehicle while the battery of the vehicle is being charged, in consideration of the update time for each update target and the charging schedule. By performing the update in conjunction with the charging schedule, it is possible to maintain a stable battery state.

16 Claims, 8 Drawing Sheets

| Index | UPDATE TARGET | PROTOCOL | CONSUMED TIME | |
|---|---|---|---|---|
| | | | FIRST UPDATE AREA | SECOND UPDATE AREA |
| 1 | FIRST UPDATE TARGET | CAN | 100 | 10 |
| 2 | SECOND UPDATE TARGET | Eth | 200 | 15 |
| 3 | THIRD UPDATE TARGET | CAN-FD | 300 | 25 |

APPARATUS FOR UPDATING A VEHICLE AND A METHOD THEREOF

CROSS-REFERENCE TO RELATED APPLICATION

This application claims the benefit of priority to Korean Patent Application No. 10-2020-0170858, filed in the Korean Intellectual Property Office on Dec. 8, 2020, the entire contents of which are incorporated herein by reference.

TECHNICAL FIELD

The present disclosure relates to an apparatus for updating a vehicle and method thereof, and more particularly, relates to an apparatus for improving an update for a vehicle and method thereof.

BACKGROUND

Electronicization related to vehicles is increasing, and accordingly, a number of controllers are used in vehicles for the convenience of drivers and occupants. At the same time, a wireless update function is applied to improve functions of the controllers or perform a new service.

The update of a vehicle is performed in a state in which the vehicle is stopped or in a state in which the vehicle is not running, i.e., when the ignition is off (IG-OFF). At this time, capacity and time constraints for reprogramming may occur depending on a state of the vehicle's battery.

Electric vehicles (EV) or plug-in hybrid electric vehicles (PHEV) perform rapid charging and slow charging according to a state of the battery. In the case of slow charging, charging is performed in the stopped state in consideration of a charging schedule according to the charging fee for the efficiency of charging rates.

However, there is a possibility that data download for reprogramming and execution of reprogramming may be limited depending on the battery and a charging state. Thus, the need for a technology that enables the update in a safe state of the battery has emerged. The necessity of such technology is becoming more prominent because the size of update information or data, such as high-precision map data and image data processing algorithms, also increases as functions such as autonomous driving increase.

SUMMARY

The present disclosure has been made to solve the above-mentioned problems occurring in the prior art while advantages achieved by the prior art are maintained intact.

An aspect of the present disclosure provides a vehicle update apparatus and a method that perform an update in consideration of the state of a battery to enable a stable update.

Another aspect of the present disclosure provides a vehicle update apparatus and a method capable of maintaining a stable battery state by performing an update in conjunction with a charging schedule of an electric vehicle.

Another aspect of the present disclosure provides a vehicle update apparatus and a method that improve data conversion efficiency through data conversion based on a lookup table for over-the-air (OTA) updates.

Another aspect of the present disclosure provides a vehicle update apparatus and a method that do not incur a large cost by implementing a technology for performing an update using the charging schedule information in software without additional configuration of a controller or additional configuration of hardware.

Another aspect of the present disclosure provides a vehicle update apparatus and a method that may efficiently use an update time and a battery capacity by applying the subject matter of the present disclosure instead of increasing a battery performance to secure an update time and a battery capacity.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, an apparatus for updating a vehicle includes a processor that calculates an update time for each update target of an OTA update for the vehicle in which a battery is charged based on a charging schedule. The processor also performs the OTA update of the vehicle while the battery of the vehicle is being charged, in consideration of the update time for each update target and the charging schedule.

In an embodiment, the processor may configure a lookup table associated with the OTA update for each update target and may calculate the update time for each update target through the lookup table.

In an embodiment, the processor may perform all of the OTA update for each update target, when the update time for each update target does not exceed a time during which charging is in progress determined through the charging schedule.

In an embodiment, the processor may classify an update area for each update target into a first update area where a full update is needed and a second update area where a partial update is possible. The processor may also calculate an update time for the first update area and an update time for the second update area.

In an embodiment, the processor may perform the OTA update of the first update area prior to the OTA update of the second update area while the battery is being charged.

In an embodiment, the processor may perform the OTA update of the first update area while the battery is being charged, when the OTA update of the first update area is possible within a time during which charging is in progress determined through the charging schedule.

In an embodiment, the processor may perform the partial update of the second update area while the battery is being charged, when the update time of the second update area exceeds a time obtained by subtracting the update time of the first update area from the time during which the charging is in progress, after performing the OTA update of the first update area.

In an embodiment, the processor may perform the OTA update depending on whether a power supply state, which is determined in consideration of a state of the battery, is an updateable power supply state.

In an embodiment, the processor may reset the charging schedule by applying a consumption amount of the battery consumed in the OTA update.

In an embodiment, the processor may perform the OTA update of the vehicle in consideration of the update time for each update target and the charging schedule when the battery of the vehicle is in slow charging.

According to an aspect of the present disclosure, a method of updating a vehicle includes calculating an update time for each update target of an OTA update for the vehicle in which a battery is charged based on a charging schedule. The method also includes performing the OTA update of the vehicle while the battery of the vehicle is being charged, in consideration of the update time for each update target and the charging schedule.

In an embodiment, the method may further include configuring a lookup table associated with the OTA update for each update target. The calculating of the update time for each update target may include calculating the update time for each update target through the lookup table.

In an embodiment, the performing of the OTA update of the vehicle in consideration of the update time for each update target and the charging schedule may include performing all of the OTA update for each update target, when the update time for each update target does not exceed a time during which charging is in progress determined through the charging schedule.

In an embodiment, the method may further include classifying an update area for each update target into a first update where a full update is needed and a second update area where a partial update is possible. The method may further include calculating an update time for the first update area and an update time for the second update area.

In an embodiment, the performing of the OTA update of the vehicle in consideration of the update time for each update target and the charging schedule may further include performing the OTA update of the first update area prior to the OTA update of the second update area while the battery is being charged.

In an embodiment, the performing of the OTA update of the vehicle in consideration of the update time for each update target and the charging schedule may include performing the OTA update of the first update area while the battery is being charged, when the update of the first update area is possible within a time during which charging is in progress determined through the charging schedule.

In an embodiment, the performing of the OTA update of the vehicle in consideration of the update time for each update target and the charging schedule may further include performing the partial update of the second update area while the battery is being charged, when the update time of the second update area exceeds a time obtained by subtracting the update time of the first update area from the time during which the charging is in progress, after performing the OTA update of the first update area.

In an embodiment, the performing of the OTA update of the vehicle in consideration of the update time for each update target and the charging schedule may further include performing the OTA update depending on whether a power supply state, which is determined in consideration of a state of the battery, is an updateable power supply state.

In an embodiment, the method may further include resetting the charging schedule by applying a consumption amount of the battery consumed in the OTA update.

In an embodiment, the performing of the OTA update of the vehicle in consideration of the update time for each update target and the charging schedule may include performing the OTA update of the vehicle in consideration of the update time for each update target and the charging schedule when the battery of the vehicle is in slow charging.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Hereinafter, some embodiments of the present disclosure are described in detail through the accompanying drawings. In adding reference numerals to elements of each drawing, it should be noted that the same or equivalent elements are assigned the same numerals even if they are indicated on different drawings. In addition, in describing an embodiment of the present disclosure, if it is determined that a detailed description of a related known configuration or function obstructs an understanding of the embodiment of the present disclosure, a detailed description thereof has been omitted.

In describing the elements of the embodiments of the present disclosure, terms such as first, second, A, B, (a), (b), etc. may be used. These terms are only for distinguishing the element from other elements and the nature, order, or order of the element is not limited by the term. In addition, unless otherwise defined, all terms used herein, including technical or scientific terms, have the same meaning as commonly understood by those having ordinary skill in the art to which the present disclosure belongs. Terms such as those defined in a commonly used dictionary should be interpreted as having a meaning consistent with the meaning in the context of the related technology. These terms should not be interpreted as an ideal or excessively formal meaning unless explicitly defined in this application. When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to FIGS. 1-7.

Figure 1:
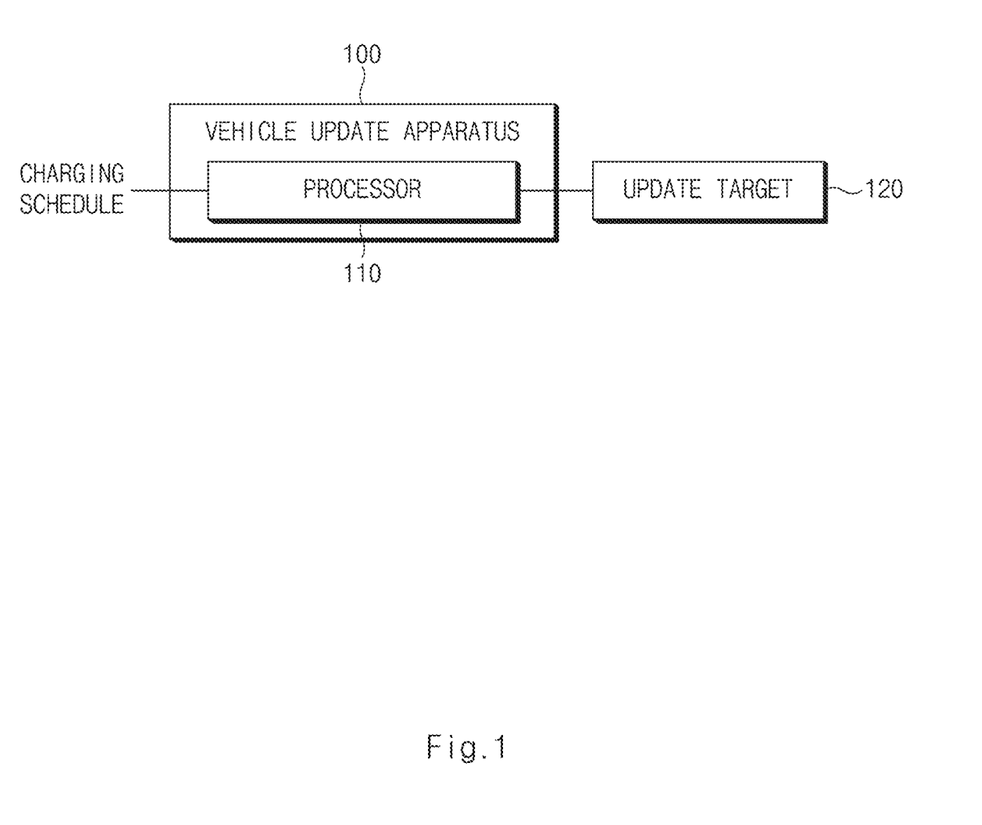
FIG. 1 is a block diagram illustrating a vehicle update apparatus according to an embodiment of the present disclosure.

FIG. 1 is a block diagram illustrating a vehicle update apparatus according to an embodiment of the present disclosure.

Referring to FIG. 1, a vehicle update apparatus 100 may be implemented including a processor 110.

The vehicle update apparatus 100 may be provided integrally with the vehicle. In another embodiment, the vehicle update apparatus 100 may be installed in/attached to the vehicle in a configuration separate from the vehicle. In another embodiment, some elements of the vehicle update apparatus 100 may be implemented integrally with the vehicle while other parts of the vehicle update apparatus 100 may be installed in/attached to the vehicle in a separate configuration from the vehicle.

For example, a vehicle equipped with the vehicle update apparatus 100 may include an electric vehicle (EV) or a plug-in hybrid electric vehicle (PHEV) that receives electricity through external charging.

The processor 110 may be directly or indirectly connected to an update target 120 through wireless or wired communication and may electrically control each component of the vehicle. The processor 110 may be implemented in the form of hardware, software, or a combination of hardware and software. In an embodiment, the processor 110 may be implemented with a microprocessor, but is not limited thereto. In addition, the processor 110 may perform various data processing and calculations, which are described below.

As an example, the processor 110 may receive information on a charging schedule.

For example, the processor 110 may receive information on the charging schedule through a power line communication (PLC) from a charging server through a charger and a charging controller provided in the vehicle. In this process, the charging controller provided in the vehicle may receive information on the charging schedule while charging through the PLC from the charger.

As an example, the processor 110 may perform an over-the-air (OTA) update of the vehicle while the battery of the vehicle is being charged, based on the charging schedule.

As an example, the processor 110 may calculate an update time for each update target 120.

As an example, the processor 110 may perform the OTA update in consideration of the update time for each update target 120 and the charging schedule.

As an example, the processor 110 may configure a lookup table associated with the update for each update target 120. Specifically, the processor 110 may receive update-related information for each update target 120 through communication with an OTA update server to configure the lookup table.

The update target 120 may include a controller of the vehicle that is an OTA update target.

As an example, the update target 120 may include a controller including software capable of OTA updating.

As an example, the processor 110 may update the controller of the vehicle, based on a ROM (Read-Only Memory) file received from the OTA update server.

For example, the processor 110 may perform control of a process of reprogramming the controller during the update process of receiving the ROM file and reprogramming the controller in consideration of the charging schedule.

Figure 2A:
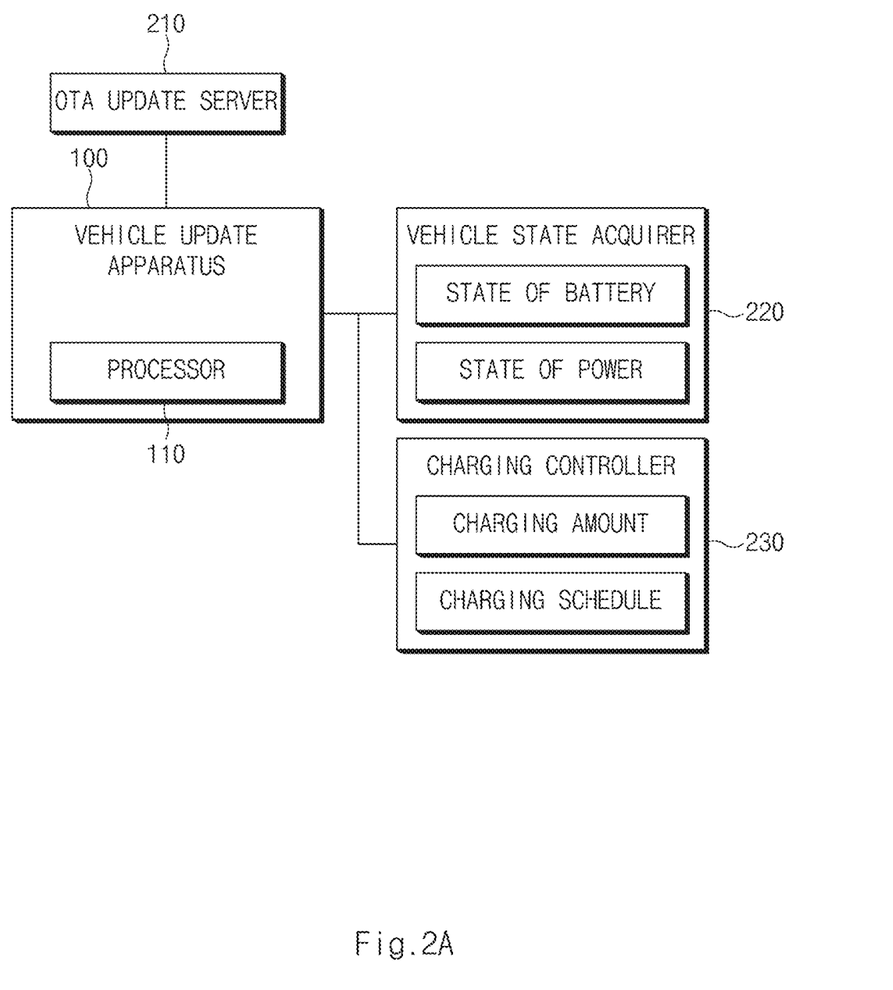
FIG. 2A is a diagram illustrating a configuration of a system including a vehicle update apparatus according to an embodiment of the present disclosure.

FIG. 2A is a diagram illustrating a configuration of a system including a vehicle update apparatus according to an embodiment of the present disclosure.

The vehicle update apparatus 100 may transmit and receive information by communicating with an OTA update server 210, a vehicle state acquirer 220, and a charging controller 230.

As an example, the OTA update server 210 is a server that manages the OTA update and may store the ROM file required for the OTA update.

For example, the OTA update server 210 may transmit the ROM file to the vehicle update apparatus 100 through an Open Mobile Alliance-Device Management (OMA-DM) communication.

The vehicle state acquirer 220 may be directly or indirectly connected to the vehicle update apparatus 100 through wireless or wired communication.

As an example, the vehicle state acquirer 220 may acquire information on a state of a battery of the vehicle and a state of a power source of the vehicle.

As an example, the vehicle state acquirer 220 may transfer information on the state of the battery of the vehicle and the state of the power source of the vehicle to the vehicle update apparatus 100.

As an example, the vehicle state acquirer 220 may include a battery sensor (e.g., Intelligent Battery Sensor: IBS).

As an example, the vehicle state acquirer 220 may be connected to the power source of the vehicle to obtain information on the power source.

The charging controller 230 may control a process in which the vehicle charges the battery through the charger.

The charging controller 230 may be directly or indirectly connected to the vehicle update apparatus 100 through wireless or wired communication.

For example, the charging controller 230 may obtain information on a charging amount charged through the charger and the charging schedule.

For example, the charging controller 230 may receive the ROM file, while the battery is being charged, by using the PLC from a dedicated charger.

As an example, the charging controller 230 may transfer information on the charging amount and the charging schedule to the vehicle update apparatus 100.

As an example, in the case of slow charging, the charging controller 230 may transfer a time to the vehicle update apparatus 100 during which the slow charging is in progress with the power source connected based on the charging schedule obtained through communication.

The processor 110 may transmit and receive information by communicating with the OTA update server 210, the vehicle state acquirer 220, and the charging controller 230.

The processor 110 may configure the lookup table associated with the update for each update target and may calculate the update time for each update target through the lookup table.

For example, the processor 110 may determine information associated with the update time required for reprogramming of each update target through datafication using the lookup table.

The processor 110 may classify an update area for each update target into a first update area where full update is needed and a second update area where a partial update is possible.

As an example, the first update area may include a code area in which reprogramming is entirely required among areas of the update.

As an example, the second update area may include a data area capable of performing partial reprogramming among the areas of the update.

The processor 110 may calculate the update time of the first update area and the second update area.

The processor 110 may perform the OTA update depending on whether a power supply state, which is determined in consideration of a state of the battery is an updateable power supply state.

As an example, the processor 110 may determine whether the power source is being supplied to enable reprogramming through information on the battery state or the power supply state.

As an example, while the battery of the vehicle is being slowly charged, the processor 110 may perform the OTA update of the vehicle in consideration of the update time for each update target and the charging schedule.

When the update time for each update target does not exceed a time during which charging is in progress determined through the charging schedule, the processor 110 may perform all of the update for each update target.

The processor 110 may perform the update of the first update area prior to the update of the second update area while the battery is being charged.

For example, the processor 110 may perform the update of the first update area while the battery is being charged, when the update of the first update area is possible within a time during which charging is in progress determined through the charging schedule.

As an example, the processor 110 may perform the partial update of the second update area while the battery is being charged, when the update time of the second update area exceeds a time obtained by subtracting the update time of the first update area from the time during which the charging is in progress, after updating the first update area.

Figure 2B:
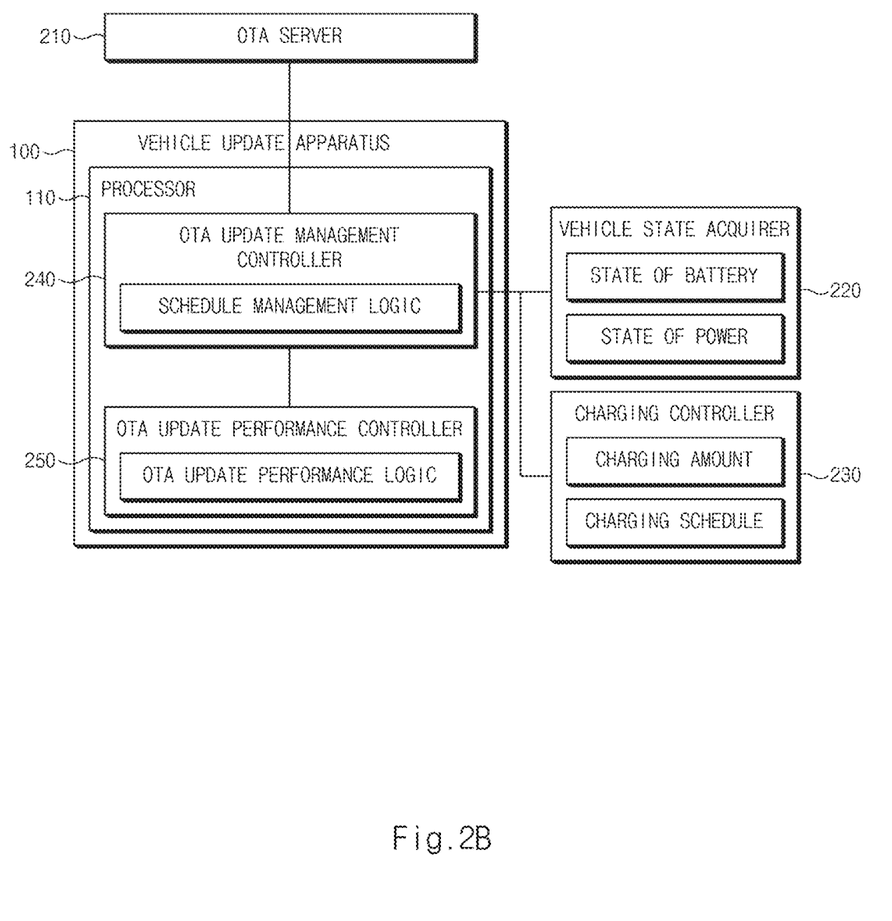
FIG. 2B is a diagram illustrating a configuration of a system including a vehicle update apparatus according to another embodiment of the present disclosure.

FIG. 2B is a diagram illustrating a configuration of a system including a vehicle update apparatus according to another embodiment of the present disclosure.

As the OTA update server 210 may perform the same function as described in FIG. 2A, a detailed description thereof has been omitted to avoid redundancy.

For example, the OTA update server 210 may be connected through communication with an OTA update management controller 240 to transmit and receive information.

For example, the OTA update server 210 may transmit the ROM file to the OTA update management controller 240 through the OMA-DM communication.

As the vehicle state acquirer 220 may perform the same function as described in FIG. 2A, a detailed description has been omitted.

For example, the vehicle state acquirer 220 may be directly or indirectly connected to the OTA update management controller 240 through wireless or wired communication.

As an example, the vehicle state acquirer 220 may transfer information on the state of the battery of the vehicle and the state of the power source of the vehicle to the OTA update management controller 240.

As the charging controller 230 may perform the same function as described in FIG. 2A, a detailed description has been omitted.

The charging controller 230 may be directly or indirectly connected to the OTA update management controller 240 through wireless or wired communication.

As an example, the charging controller 230 may transfer information on the charging amount and the charging schedule to the OTA update management controller 240.

For example, in the case of slow charging, the charging controller 230 may transfer a time, to the OTA update management controller 240, during which the slow charging is in progress with the power source connected based on the charging schedule obtained through communication.

The processor 110 may be implemented including the OTA update management controller 240 and an OTA update performance controller 250.

The OTA update management controller 240 may include schedule management logic.

For example, the OTA update management controller 240 may communicate with the OTA update server 210, the vehicle state acquirer 220, the charging controller 230, and the OTA update performance controller 250 to transmit and receive information.

The OTA update management controller 240 may configure the lookup table related to the update for each update target and may calculate the update time for each update target through the lookup table.

For example, the OTA update management controller 240 may determine information on the update time required for reprogramming of each update target through datafication using the lookup table.

The OTA update management controller 240 may classify the update area for each update target into the first update area where a full update is needed and the second update area where the partial update is possible.

As an example, the first update area may include a code area in which reprogramming is entirely required among the areas of the update.

As an example, the second update area may include a data area where a partial reprogramming is possible among the areas of the update.

The OTA update management controller 240 may calculate the update time of the first update area and the second update area.

The OTA update management controller 240 may perform the OTA update depending on whether a power supply state, which is determined in consideration of a state of the battery is an updateable power supply state.

For example, the OTA update management controller 240 may determine whether the power source is being supplied to enable reprogramming through information on a battery state or a power state.

For example, the OTA update management controller 240 may perform the OTA update by transferring a command for the OTA update to the OTA update performance controller 250.

For example, when the battery of the vehicle is being slowly charged, the OTA update management controller 240 may perform the OTA update of the vehicle in consideration of the update time for each update target and the charging schedule.

When the update time for each update target does not exceed a charging time determined through the charging schedule, the OTA update management controller 240 may perform all of the update for each update target.

The OTA update management controller 240 may perform the update of the first update area prior to the update of the second update area while the battery is being charged.

As an example, the OTA update management controller 240 may perform the update of the first update area while the battery is being charged when the update of the first update area is possible within a time during which charging is in progress determined through the charging schedule.

For example, the OTA update management controller 240 may perform the partial update of the second update area while the battery is being charged, when the update time of the second update area exceeds a time obtained by subtracting the update time of the first update area from the time during which the charging is in progress, after updating the first update area.

The OTA update performance controller 250 may include OTA update performance logic.

As an example, the OTA update performance controller 250 may receive a command related to the OTA update from the OTA update management controller 240 and may perform the OTA update.

Figure 3:
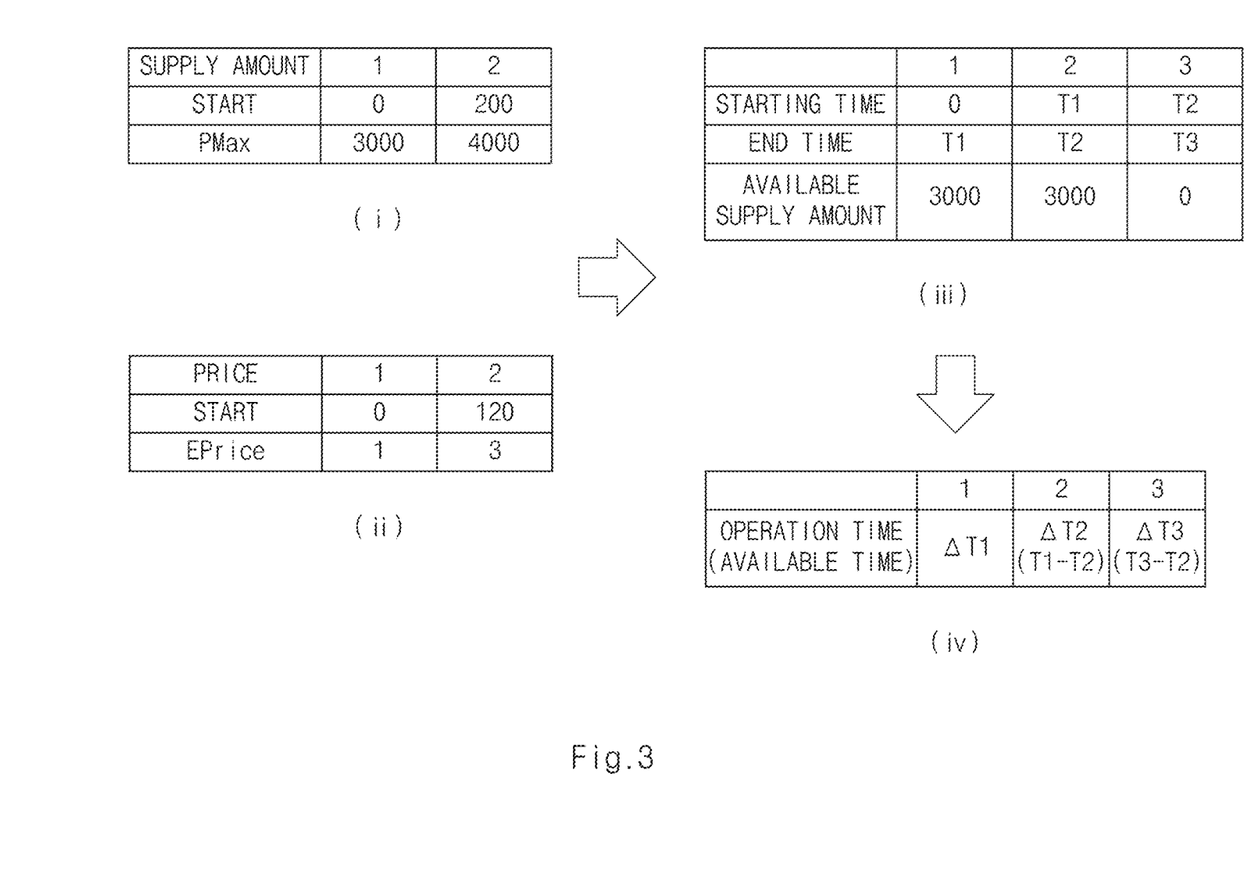
FIG. 3 is a diagram illustrating a process of calculating a charging profile according to an embodiment of the present disclosure.

FIG. 3 is a diagram illustrating a process of calculating a charging profile according to an embodiment of the present disclosure.

Referring to FIG. 3, the vehicle update apparatus 100 may calculate a table indicating the amount of power supplied by the charger as illustrated in a table (i) according to the charging schedule.

A horizontal axis of the table (i) may indicate a block corresponding to a time during which charging is in progress.

According to the table (i), when the time is '0', the maximum value of a supply amount may be 3000 in a first block where charging is started.

In addition, according to the table (i), the maximum value of the supply amount in the second block charged when the time is 200 may be 4000.

Units of time and supply amount are not indicated, but since they are exemplary values for indicating a relative size, they may actually have units of time and power, respectively.

The vehicle update apparatus 100 may calculate a table indicating the charging price according to the charging schedule as illustrated in a table (ii).

According to the table (ii), in the block starting when the time is '0', the charging price may be a price corresponding to '1' per unit time.

According to the table (ii), in the block starting when the time is 120, the charging price may be a price corresponding to '3' per unit time.

Units of time and charge price are not indicated but may have units representing time and price per unit time, respectively.

The vehicle update apparatus 100 may calculate a table including information of a start time, an end time, and an available supply amount as illustrated in a table (iii).

According to the table (iii), it is possible to provide an available supply amount corresponding to 3000 for a time of 0 to T1 in the first block.

According to the table (iii), it is possible to provide an available supply amount corresponding to 3000 for a time of T1 to T2 in the second block.

According to the table (iii), it is possible to provide an available supply amount corresponding to '0' for a time of T2 to T3 in the third block.

The vehicle update apparatus 100 may calculate a table indicating an operation time (available time) for each block as illustrated in a table (iv).

The operation time (available time) may mean a time during which power capable of performing the update may be supplied according to charging and battery states.

According to the table (iv), the update may be performed for a time corresponding to $\Delta T1$ in the first block, the update may be performed for a time corresponding to $\Delta T2$ calculated as T2-T1 in the second block, and the update may be performed for a time corresponding to $\Delta T3$ calculated as T3-T2 in the third block.

Figure 4:
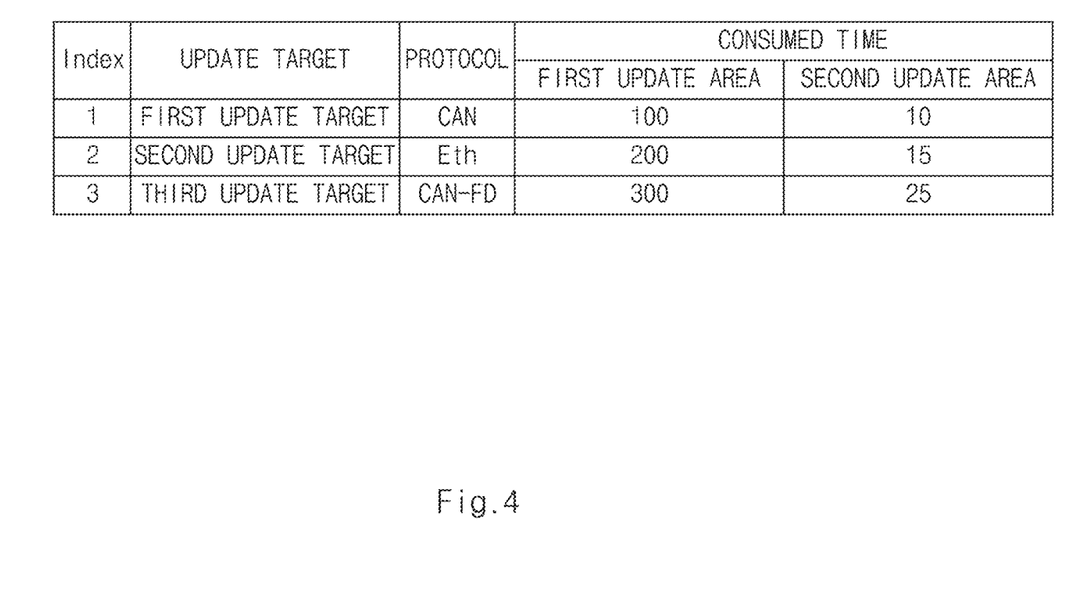
FIG. 4 is a diagram illustrating an update time calculated through a lookup table related to an update according to an embodiment of the present disclosure.

FIG. 4 is a diagram illustrating an update time calculated through a lookup table related to an update according to an embodiment of the present disclosure.

Referring to FIG. 4, the vehicle update apparatus 100 may calculate the update time for each update target through the lookup table.

As an example, the vehicle update apparatus 100 may classify and calculate an update area for each update target into the first update area where full update is required and the second update area where the partial update is possible.

Referring to FIG. 4, the lookup table may include information of protocols for a first update target, a second update target, and a third update target, information of an update time corresponding to the first update area, and information of an update time corresponding to the second update area.

According to FIG. 4, the first update target may use a protocol of CAN communication, the update time of the first update area may be calculated as 100, and the update time of the second update area may be calculated as 10.

In addition, the second update target may use an Ethernet protocol, the update time of the first update area may be calculated as 200, and the update time of the second update area may be calculated as 15.

In addition, the third update target may use a protocol of CAN-FD communication, and an update time of the first update area may be calculated as 300 and an update time of the second update area may be calculated as 25.

In this case, units of the update time of the first update area and the update time of the second update area have been omitted and may have a unit of time.

Figure 5:
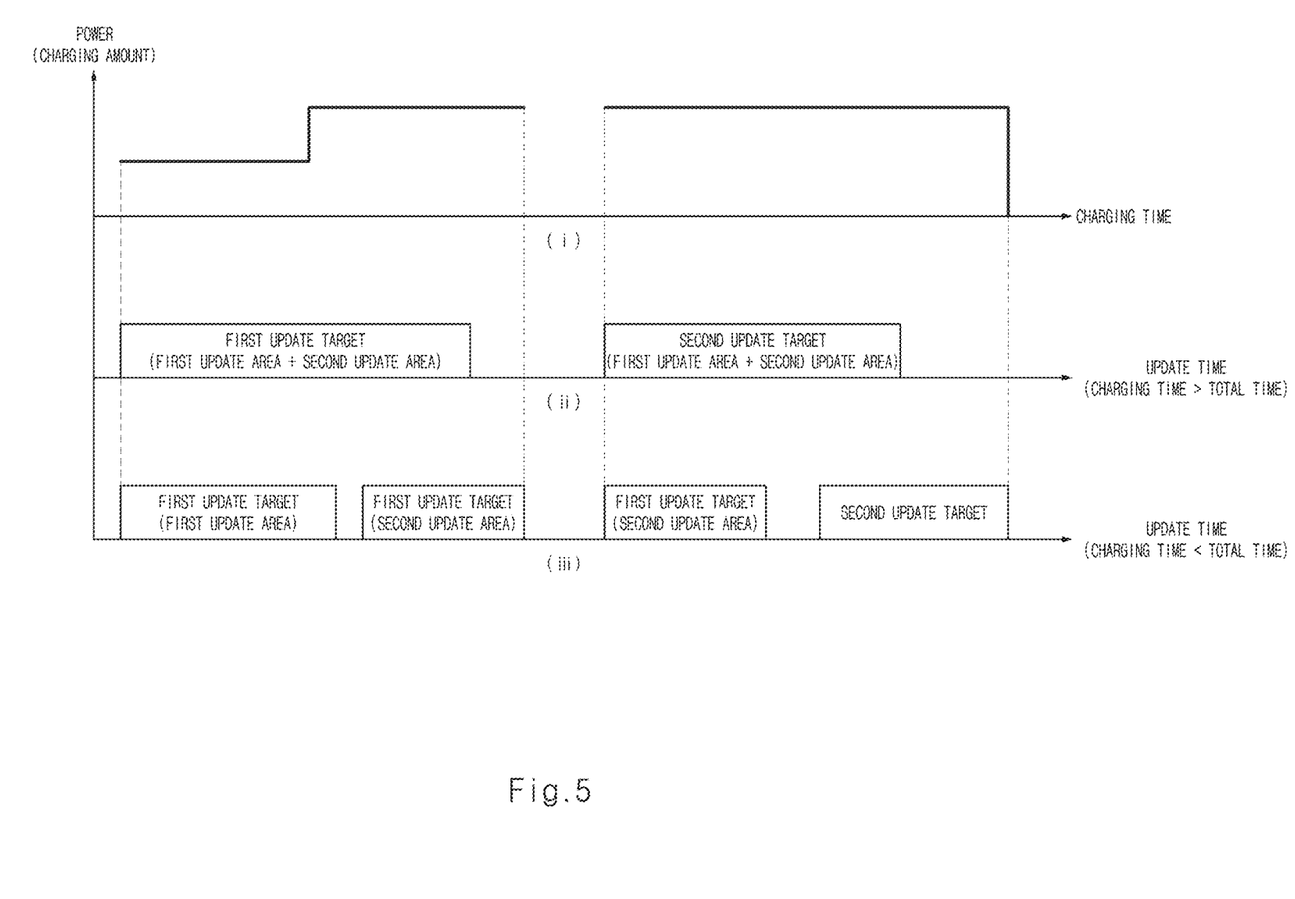
FIG. 5 is a diagram illustrating an update according to an embodiment of the present disclosure in a graph.

FIG. 5 is a diagram illustrating an update according to an embodiment of the present disclosure in a graph.

A graph (i) is a graph showing the charging amount according to the charging time.

According to the graph (i), the amount of power supplied at each time may be different and a portion without a supply amount is a portion in which charging does not proceed. Accordingly, the vehicle update apparatus 100 may perform the update such that the update is performed during the charging time.

A graph (ii) is a graph showing a case in which the charging time exceeds the time for performing each update of the first update target and the second update target. In this case, the vehicle update apparatus 100 may perform all updates of the first update target in the first block and thus may perform the update of the first update target while charging is in progress. In addition, the vehicle update apparatus 100 may perform all of the updates of the second update target in the second block and thus may perform the update of the second update target while charging is in progress.

A graph (iii) is a graph showing a case in which the update time of the first update target exceeds the time during which charging is in progress.

In this case, the vehicle update apparatus 100 may determine whether the update of the first update area may be performed while charging is in progress since the update time of the first update area of the first update target does not exceed the time during which charging is in progress.

In addition, when the vehicle update apparatus 100 may perform the update of the first update area while charging is in progress, the vehicle update apparatus 100 may perform the update of the first update area prior to the update of the second update area while charging is in progress.

After performing the update of the first update area, the vehicle update apparatus 100 may perform the partial update of the second update area while charging is in progress, when the update time of the second update area exceeds a time obtained by subtracting the update time of the first update area from the time during which the charging is in progress.

Thereafter, the vehicle update apparatus 100 may perform the update of the second update area and perform an update of the remaining portion of the second update area at a time when charging is in progress in the second block.

The vehicle update apparatus 100 may perform the update of the second update target after the update of the first update target is finished.

Figure 6:
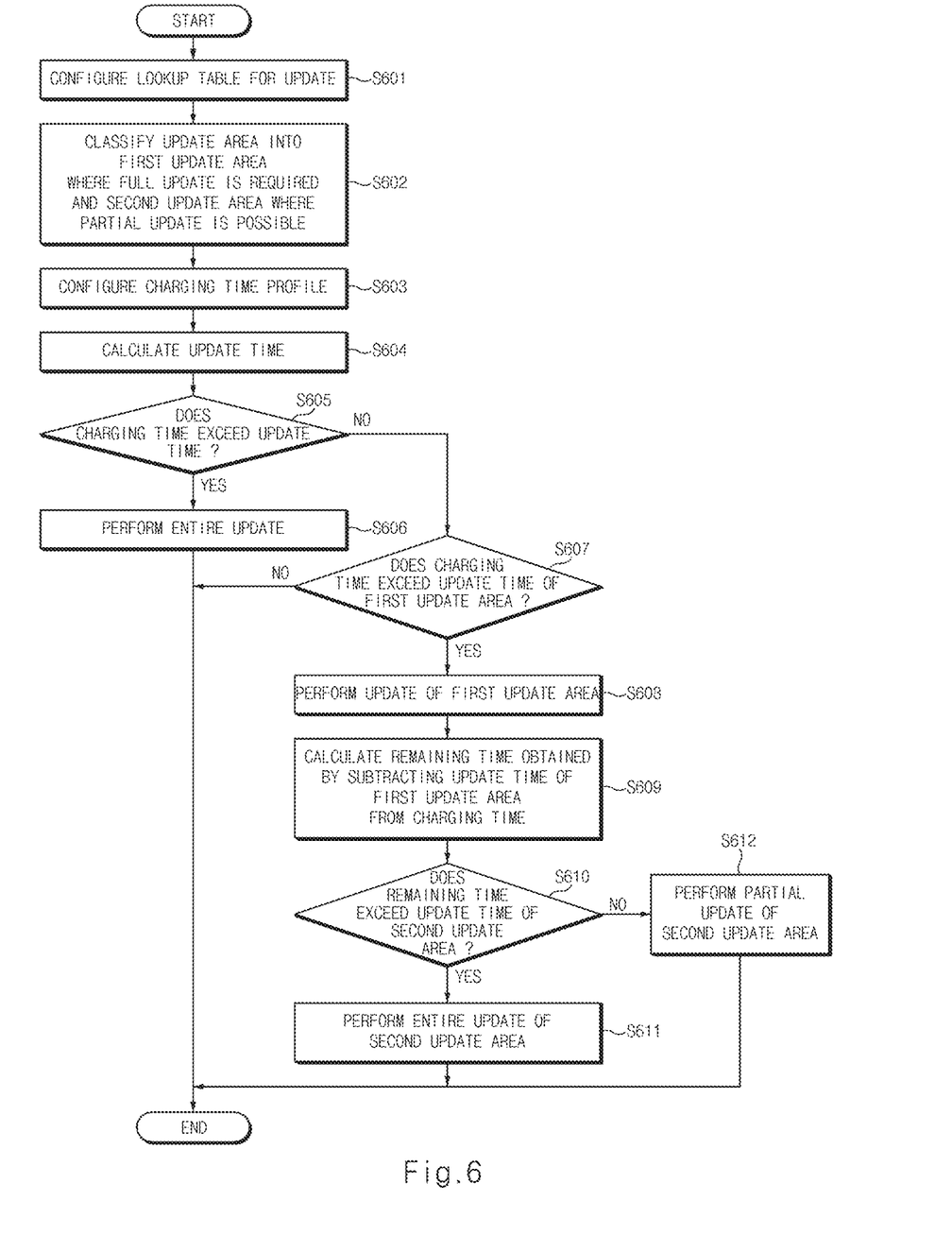
FIG. 6 is a flowchart illustrating a vehicle update method according to an embodiment of the present disclosure.

FIG. 6 is a flowchart illustrating a vehicle update method according to an embodiment of the present disclosure.

The vehicle update apparatus 100 may configure the lookup table for the update (S601).

As an example, the vehicle update apparatus 100 may configure the lookup table including information on a size of data required for updating and information on a data processing speed for each update target.

As an example, the vehicle update apparatus 100 may configure the lookup table including information on the protocol used for each update target.

After configuring the update lookup table, the vehicle update apparatus 100 may classify the update area into the first update area where full update is required and the second update area where the partial update is possible (S602).

As an example, the vehicle update apparatus 100 may classify the update area into the first update area including a code area requiring a full reprogramming and the second update area including a data area where the partial reprogramming is possible.

After classifying the update area into the first update area and the second update area where the partial update is possible, the vehicle update apparatus 100 may configure a charging time profile (S603).

As an example, the vehicle update apparatus 100 may configure the charging time profile including information on an available time calculated based on information of a charging supply amount, a charging price, and an available supply amount.

After configuring the charging time profile, the vehicle update apparatus 100 may calculate the update time (S604).

For example, the vehicle update apparatus 100 may calculate the update time through the lookup table and may calculate each update time by separating the first update area and the second update area.

As an example, the vehicle update apparatus 100 may calculate the update time by using information on a size of data required for updating and information on a data processing speed for each update target included in the lookup table.

After calculating the update time, the vehicle update apparatus 100 may check whether the charging time exceeds the update time (S605).

For example, the vehicle update apparatus 100 may determine the charging time through the charging time profile and may check whether the determined charging time exceeds a total update time calculated through the lookup table.

When the charging time exceeds the update time, the vehicle update apparatus 100 may perform the entire update (S606).

As an example, when the charging time exceeds the update time, the vehicle update apparatus 100 may determine that a stable battery state may be maintained for the time during which the update is performed and may perform the entire update.

When the charging time does not exceed the update time, the vehicle update apparatus 100 may check whether the charging time exceeds the update time of the first update area (S607).

For example, the vehicle update apparatus 100 may determine the charging time through the charging time profile and may check whether the determined charging time exceeds the update time of the first update area that is calculated through the lookup table.

When the charging time exceeds the update time of the first update area, the vehicle update apparatus 100 may update the first update area (S608).

After performing the update of the first update area, the vehicle update apparatus 100 may calculate a remaining time obtained by subtracting the update time of the first update area from the charging time (S609).

After calculating the remaining time obtained by subtracting the update time of the first update area from the charging time, the vehicle update apparatus 100 may check whether the remaining time exceeds the update time of the second update area (S610).

As an example, the vehicle update apparatus 100 may check whether the calculated remaining time exceeds the update time of the second update area that is calculated through the lookup table.

When the remaining time exceeds the update time of the second update area, the vehicle update apparatus 100 may perform the entire update of the second update area (S611).

As an example, when the remaining time exceeds the update time of the second update area, the vehicle update apparatus 100 may determine that a stable battery state may be maintained during the time in which the update of the second update area is performed and may perform the entire update of the second update area.

When the remaining time does not exceed the update time of the second update area, the vehicle update apparatus 100 may perform the partial update of the second update area (S612).

As an example, when the remaining time does not exceed the update time of the second update area, the vehicle update apparatus 100 may perform the partial update of the second update area, which may be performed during the remaining time, and thus may use the charging time as efficiently as possible.

Figure 7:
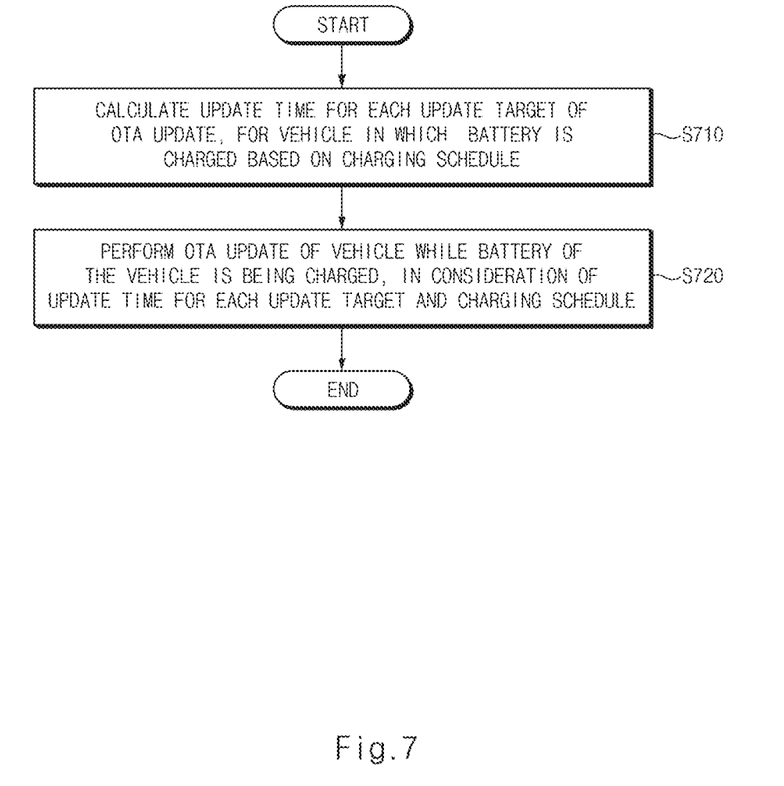
FIG. 7 is a flowchart illustrating a vehicle update method according to another embodiment of the present disclosure.

FIG. 7 is a flowchart illustrating a vehicle update method according to another embodiment of the present disclosure.

Referring to FIG. 7, the vehicle update method may include calculating an update time for each update target of an OTA update for the vehicle in which a battery is charged based on a charging schedule (S710). The method may also include performing the OTA update of the vehicle while the battery of the vehicle is being charged, in consideration of the update time for each update target and the charging schedule (S720).

As an example, the calculating of the update time for each update target of the OTA update (S710) may include calculating the update time for each update target through the configured lookup table.

As an example, the calculating of the update time for each update target of the OTA update (S710) may include classifying an update area for each update target into a first update where a full update is needed and a second update area where the partial update is possible. The method may also include calculating the update time for the first update area and the second update area.

For example, the performing of the OTA update of the vehicle while the battery of the vehicle is being charged, in consideration of the update time for each update target and the charging schedule (S720) may include performing all of the OTA update for each update target, when the update time for each update target does not exceed a time during which charging is in progress determined through the charging schedule.

For example, the performing of the OTA update of the vehicle while the battery of the vehicle is being charged, in consideration of the update time for each update target and the charging schedule (S720) may include performing the update of the first update area while the battery is being charged, when the update of the first update area is possible within a time during which charging is in progress determined through the charging schedule.

For example, the performing of the OTA update of the vehicle while the battery of the vehicle is being charged, in consideration of the update time for each update target and the charging schedule (S720) may include performing the partial update of the second update area while the battery is being charged, when the update time of the second update area exceeds a time obtained by subtracting the update time of the first update area from the time during which the charging is in progress, after performing the OTA update of the first update area.

For example, the performing of the OTA update of the vehicle while the battery of the vehicle is being charged, in consideration of the update time for each update target and the charging schedule (S720) may include performing the update depending on whether a power supply state, which is determined in consideration of a state of the battery is an updateable power supply state.

For example, when the state of the battery is less charged such that it is impossible to supply the power consumed in the process of performing the update and when it is impossible to supply the power consumed even through charging, the vehicle update apparatus 100 may perform the update after the battery is charged to a certain amount.

For example, the performing of the OTA update of the vehicle while the battery of the vehicle is being charged, in consideration of the update time for each update target and the charging schedule (S720) may include performing the OTA update of the vehicle in consideration of the update time for each update target and the charging schedule when the battery of the vehicle is in slow charging.

As an example, when the battery of the vehicle is in rapid charging, the vehicle update apparatus 100 may not apply the charging schedule and the vehicle update apparatus 100 may perform the OTA update of the vehicle in a conventional manner without considering the update time and the charging schedule because the battery charging time is short.

Although not illustrated, the vehicle update method may further include resetting the charging schedule by applying the consumption amount of the battery consumed for the OTA update.

As an example, the vehicle update apparatus 100 may reset the charging schedule to further charge by the amount of the battery consumed for the OTA update or by the amount obtained by adding a spare charge amount from the amount of battery consumed to the OTA update.

According to an embodiment of the present disclosure, it is possible to provide a vehicle update apparatus and a method thereof that enable stable update by performing an update in consideration of the state of a battery.

In addition, according to an embodiment of the present disclosure, it is possible to provide a vehicle update apparatus and a method thereof capable of maintaining a stable battery state by performing an update in conjunction with a charging schedule of an electric vehicle.

In addition, according to an embodiment of the present disclosure, it is possible to provide a vehicle update apparatus and a method thereof capable of improving data conversion efficiency through data conversion based on a lookup table for OTA update.

In addition, according to an embodiment of the present disclosure, it is possible to provide a vehicle update apparatus and a method thereof that do not require much cost by implementing a technology for performing an update using charging schedule information in software without additional configuration of a controller or additional configuration of hardware.

In addition, according to an embodiment of the present disclosure, by applying the present disclosure instead of an increase in battery performance to secure an update time and battery capacity, it is possible to provide a vehicle update apparatus and method thereof capable of efficiently using an update time and battery capacity.

In addition to this, various effects identified directly or indirectly through this document may be provided.

The above description merely illustrates the technical idea of the present disclosure. Those having ordinary skill in the art to which the present disclosure pertains should be able to make various modifications and variations without departing from the essential characteristics of the present disclosure.

Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the following claims and all technical ideas within the scope equivalent thereto should be construed as being included in the scope of the present disclosure.

What is claimed is:

1. An apparatus for updating a vehicle, the apparatus comprising:
a processor configured to
calculate an update time for each update target of an over-the-air (OTA) update for the vehicle in which a battery is charged based on a charging schedule, and configured to perform the OTA update of the vehicle while the battery of the vehicle is being charged, in consideration of the update time for each update target and the charging schedule,
classify an update area for each update target into a first update area where a full update is needed and a second update area where a partial update is possible,
calculate an update time for the first update area and an update time for the second update area, and
perform the partial update of the second update area while the battery is being charged, when the update time of the second update area exceeds a time obtained by subtracting the update time of the first update area from a time during which charging is in progress determined through the charging schedule, after performing the OTA update of the first update area.

2. The apparatus of claim 1, wherein the processor configures a lookup table associated with the OTA update for each update target and calculates the update time for each update target through the lookup table.

3. The apparatus of claim 1, wherein the processor performs all of the OTA update for each update target, when the update time for each update target does not exceed the time during which the charging is in progress determined through the charging schedule.

4. The apparatus of claim 1, wherein the processor performs the OTA update of the first update area prior to the OTA update of the second update area while the battery is being charged.

5. The apparatus of claim 1, wherein the processor performs the OTA update of the first update area while the battery is being charged, when the OTA update of the first update area is possible within the time during which the charging is in progress determined through the charging schedule.

6. The apparatus of claim 1, wherein the processor performs the OTA update depending on whether a power supply state, which is determined in consideration of a state of the battery, is an updateable power supply state.

7. The apparatus of claim 1, wherein the processor resets the charging schedule by applying a consumption amount of the battery consumed in the OTA update.

8. The apparatus of claim 1, wherein the processor performs the OTA update of the vehicle in consideration of the update time for each update target and the charging schedule when the battery of the vehicle is in slow charging.

9. A method of updating a vehicle, the method comprising:
- calculating an update time for each update target of an over-the-air (OTA) update for the vehicle in which a battery is charged based on a charging schedule;
- performing the OTA update of the vehicle while the battery of the vehicle is being charged, in consideration of the update time for each update target and the charging schedule;
- classifying an update area for each update target into a first update area where a full update is needed and a second update area where a partial update is possible;
- calculating an update time for the first update area and an update time for the second update area; and
- performing the partial update of the second update area while the battery is being charged, when the update time of the second update area exceeds a time obtained by subtracting the update time of the first update area from a time during which charging is in progress determined through the charging schedule, after performing the OTA update of the first update area.

10. The method of claim 9, further comprising:
- configuring a lookup table associated with the OTA update for each update target,
- wherein the calculating of the update time for each update target includes calculating the update time for each update target through the lookup table.

11. The method of claim 9, wherein the performing of the OTA update of the vehicle, in consideration of the update time for each update target and the charging schedule, includes
  performing all of the OTA update for each update target, when the update time for each update target does not exceed the time during which the charging is in progress determined through the charging schedule.

12. The method of claim 9, wherein the performing of the OTA update of the vehicle, in consideration of the update time for each update target and the charging schedule, further includes
  performing the OTA update of the first update area prior to the OTA update of the second update area while the battery is being charged.

13. The method of claim 9, wherein the performing of the OTA update of the vehicle, in consideration of the update time for each update target and the charging schedule, includes
  performing the OTA update of the first update area while the battery is being charged, when the OTA update of the first update area is possible within the time during which the charging is in progress determined through the charging schedule.

14. The method of claim 9, wherein the performing of the OTA update of the vehicle, in consideration of the update time for each update target and the charging schedule, further includes
  performing the OTA update depending on whether a power supply state, which is determined in consideration of a state of the battery, is an updateable power supply state.

15. The method of claim 9, further comprising:
  resetting the charging schedule by applying a consumption amount of the battery consumed in the OTA update.

16. The method of claim 9, wherein the performing of the OTA update of the vehicle, in consideration of the update time for each update target and the charging schedule, includes
  performing the OTA update of the vehicle in consideration of the update time for each update target and the charging schedule when the battery of the vehicle is in slow charging.

* * * * *